United States Patent [19]

Blomstrom

[11] 3,846,566

[45] Nov. 5, 1974

[54] PROCESS FOR INCREASING THE NATURAL COLOR INTENSITY OF SEAFOODS

[76] Inventor: Ralph Blomstrom, P. O. Box 8958, 402 74 Goteborg, Sweden

[22] Filed: July 9, 1973

[21] Appl. No.: 377,517

Related U.S. Application Data

[63] Continuation-in-part of Ser. No. 205,301, Dec. 6, 1971, abandoned.

[52] U.S. Cl. ............................... 426/250, 426/262
[51] Int. Cl. .......................................... A22c 29/00
[58] Field of Search .......... 426/250, 262, 321, 328, 426/177, 268

[56] References Cited
UNITED STATES PATENTS

| 3,206,316 | 9/1965 | Klaui | 426/250 |
| 3,365,302 | 1/1968 | Vilutis | 426/262 |

*Primary Examiner*—A. Louis Monacell
*Assistant Examiner*—R. A. Yoncoskie
*Attorney, Agent, or Firm*—Emory L. Groff; Emory L. Groff, Jr.

[57] ABSTRACT

A process for increasing the intensity of the color of seafood, e.g., crustaceans, which comprises applying thereto a solution of canthaxanthin at an elevated temperature.

12 Claims, No Drawings

PROCESS FOR INCREASING THE NATURAL COLOR INTENSITY OF SEAFOODS

This application is a continuation-in-part of application Ser. No. 205,301, filed Dec. 6, 1971, now abandoned.

BACKGROUND OF THE INVENTION

It is well known that shrimp die soon after being removed from their natural habitat and that deterioration of the shrimp sets in immediately and proceeds at a rapid rate. This deterioration not only takes the form of spoilage but also of discoloration. This discoloration normally occurs as unsightly brown blotches on the outer surfaces of the shrimp. Simultaneously therewith there also occurs a deterioration in the natural pink color of the shrimp, i.e., they become dull in appearance. The cause of this deterioration in color is not precisely known; however, it is believed that it is due to oxidative reactions and the deleterious effect of various bacteria normally found in the natural coating of shrimp and on their shells.

Moreover, shrimp have different natural colorings, dependent upon the whereabouts of their natural habitat. Shrimp are generally classified as white, brown and pink. The pink shrimp are generally found in deep water whereas the brown and white shrimp are found in more shallow waters. The same pigmentary carotenoid substance controls the coloring of all types of shrimp. The carotenoid is developed to its fullest degree by natural processes in pink shrimp; to a lesser degree in brown shrimp and to a minimum degree in white shrimp.

By present standards, in the United States, pink shrimp have the greatest consumer appeal. Notwithstanding their original color, however, it is desirable that the shrimp have a bright appearance and not display the dull appearance commonly associated with deteriorated shrimp. In some locales, however, brown shrimp or other crustaceans are found to have more aesthetic appeal. In the case of brownish colored crustaceans, however, the maintenance of a bright brown appearance as opposed to a dull brown is important.

Several methods have been introduced heretofore for providing shrimp having improved color characteristics. It has been suggested, for example, to improve the natural color and appearance of shrimp by contacting them with an acidic solution at ambient temperatures. The treatment is said to enhance the natural pink color of the shrimp.

It also has been suggested to inhibit the deterioration and discoloration of freshly netted shrimp by contacting the shrimp with a dextran solution. It has also been proposed to preserve the appearance of shrimp by subjecting the shrimp to treatment with aqueous saline solution, further treatment with a heated aqueous liquid and then cooling them in an icy liquid.

There has also been suggested a method for preserving the natural color of shrimp by treatment with an ethylenediamine tetracetic acid compound. The use of chlorine dioxide has been suggested as a treating agent for inhibiting the formation of the medicinal taste commonly associated with netted shrimp.

All of the above methods while being at least partially effective for the stated purposes, suffer from various disadvantages. Each of the methods requires either the application to the shrimp of various foreign substances or the carrying out of numerous expensive and time consuming manipulative steps.

It is an object of the present invention to provide a method for the enhancement of the color of shrimp and other crustaceans which is simple, effective and does not require the introduction into the shrimp of foreign substances.

SUMMARY OF THE INVENTION

The method of the invention comprises treating seafood with a solution of canthaxanthin or apo-carotenal at an elevated temperature. This treatment operates to enhance the intensity of the natural color of seafood, particularly, crustaceans, e.g., shrimp, King-crab meat, langostinos, etc. Canthaxanthin operates to enhance the pink coloring of the seafood whereas the apo-carotenal enhances the brownish coloration of the brown crustaceans.

DETAILED DESCRIPTION OF THE INVENTION

The exact mechanism by which the method of the invention operates to increase the intensity of the natural color of seafood is not presently known. Without intending to be bound by any theory as to the precise mechanism, it is presumed that the canthaxanthin and apo-carotenal not only impart their own pigmentary colors to the seafood but also operate to enhance the natural color producing components thereof.

It is well known that most seafoods, particularly crustaceans, e.g., shrimp, depend for their color upon the presence therein of certain carotenoid substances. Canthaxanthin and apo-carotenal being carotenoids and closely related to the color producing carotenoids present in seafood, particularly shrimp, apparently activate the natural carotenoids and stabilize them against deterioration and subsequent discoloration. In addition, the canthaxanthin and apo-carotenal impart their own characteristic colors to the treated material. Accordingly, it is believed that the treatment of the present invention has a two-fold effect; namely, the enhancement of the natural color producing substances in the seafood and an actual pigmenting or coloring of the seafood with the treating substance.

The advantages of the method of the invention over the prior art methods are numerous. First, the present method does not require the application to the seafood of foreign substances which might deleteriously affect the material at a future date. Moreover, the present method is simple and relatively easy to carry out and does not require numerous steps or the use of expensive and complicated apparatus.

It has been found that the method of the present invention is particularly applicable to shrimp. The treating substances, canthaxanthin and apo-carotenal are closely akin to the carotenoids present therein and impart colors substantially identical to that of fresh shrimp, depending, of course, on whether they are pink or brown shrimp. Thus where the shrimp to be treated are fresh, pink shrimp, the treatment results in a stabilization and enhancement of the pink color producing carotenoid. Where the shrimp to be treated are the so-called brown or white shrimp which have an underdeveloped pink carotenoid content, the canthaxanthin operates more to actually pigment or color the shrimp than enhance the natural carotenoid material, although the latter result is certainly produced to a limited extent. Where brown shrimp are treated with apo-carotenal, of course, the brownish pigment thereof is enhanced.

The treatment may be carried out in any convenient manner, i.e., by dipping, brushing, etc. It is preferred, however, to spray the shrimp with a solution of the material. It has been found that the pick-up of carotenoid may be more closely controlled where the shrimp are sprayed. Preferably, the shrimp are spaced on an oscillating or vibrating conveyor belt or screen which passes under a series of spray nozzles. The shrimp are sprayed with a fine fog or mist of the solution and "shaken" on the vibrating belt until the sprayed solution has dried thereon. The colored shrimp are then removed and packaged for consumption or conveyed for further treatment.

It is to be understood, however, that any method of contacting the shrimp with the treating solution may be employed.

Canthaxanthin and apo-carotenal are partially soluble in water and partially soluble in fatty materials. Accordingly, when applied to shrimp for aqueous solution and dried, the carotenoids dissolve in and stick to the fatty portions of the shrimp, thereby pigmenting the latter and enhancing the natural carotenoid content thereof.

In order to increase the solubility of the carotenoids in water and render the application of the aqueous solutions to the shrimp more efficient, it is preferred to include therein varying amounts of a volatile organic liquid which is miscible with water and is a solvent for the particular carotenoid. The solvent operates to increase the solubility of the carotenoid in water thereby enabling the introduction of a greater amount of the carotenoid into the shrimp in a shorter period of time.

Any volatile, organic liquid which is miscible with water and is a solvent for the carotenoid may be employed. The preferred solvent, however, is ethanol due to its relative low cost and availability.

Generally, the aqueous treating solution should contain from about 5 to about 20 percent, by weight, of carotenoid. When employed, the content of volatile organic solvent, may range from about 15 to about 50 percent, by weight.

Generally, the shrimp should be exposed to the treating solution for a time sufficient to ensure a pick-up of from about 0.001 to about 0.003 parts of carotenoid per part of shrimp. The shrimp are then dried to remove water and volatile organic solvent. The carotenoid penetrates into and is firmly bound up in the fleshy or fatty portions of the shrimp.

In order to ensure a complete penetration of the carotenoid into the shrimp and the enhancement of the natural color thereof, it is necessary to conduct the treatment at an elevated temperature, i.e., from about 55°C. to about 65°C. This is generally accomplished by heating both the shrimp and the treating solution. It will be understood, however, that only the shrimp or only the treating solution may be heated prior to contacting.

The invention will be illustrated by the following non-limiting examples.

EXAMPLE 1

A quantity of peeled raw shrimp were heated to 60° C., spread on an oscillating conveyor screen, passed beneath a series of spray nozzles and sprayed with a fine mist of an aqueous solution containing 10 percent, by weight, of canthaxanthin and 20 percent, by weight, of ethanol, which has been previously heated to 60° C. The treatment was conducted in such a manner that the shrimp were in contact with the sprayed mist for approximately one-half minute.

The conveyor screen was continuously oscillated thereafter until the shrimp had completely dried. They were found to have an enchaced natural pink color and remained color stable for several days thereafter.

EXAMPLE 2

Freshly peeled raw shrimps were placed on a conveyor belt under heat transfer lamps long enough to obtain a surface temperature of 50°–80° C. A canthaxanthin solution identical to that of Example 1 was sprayed onto the shrimp after the latter were placed on a vibrating screen until all were completely wetted. The shrimps were conveyed under the heat transfer lamps again until dry. The shrimps were frozen and stored for several days during which no change in the pink coloration of the shrimps was noticed.

EXAMPLE 3

Cooked and peeled shrimps were treated as in Example 2. Again, no change in the pink coloration of the cooked shrimps was noticed after drying, freezing, and storage.

EXAMPLE 4

King-crab meat was treated as in Example 2 with the result that the coloration thereof was stabilized for periods of time both before and after freezing.

EXAMPLE 5

Freshly peeled, cooked langostinos were treated as in Example 2. The natural coloration of the langostinos was found to be preserved on storage both before and after freezing.

I claim:

1. A method for enhancing the intensity of the natural color of crustaceans which comprises contacting the seafood with a solution of canthaxanthin or apo-carotenal at an elevated temperature above about 50°C and for a time sufficient to deposit upon said seafood at least about 0.001 parts of canthaxanthin or apo-carotenal per part of seafood.

2. The method of claim 1 wherein said crustacean is shrimp.

3. The method of claim 2 wherein said solution comprises an aqueous solution.

4. The method of claim 3 wherein said solution additionally contains a volatile organic liquid which is miscible with water and is a solvent for said canthaxanthin or apo-carotenal.

5. The method of claim 4 wherein said aqueous alcoholic solution contains ethanol.

6. The method of claim 3 wherein said aqueous solution contains from about 5 percent to about 20 percent, by weight, of canthaxanthin.

7. The method of claim 5 wherein said aqueous alcoholic solution contains from about 5 to about 20 percent, by weight, of canthaxanthin and from about 15 to about 50 percent, by weight, of ethanol.

8. The method of claim 2 wherein said contacting is effected by spraying the shrimp with said solution.

9. The method of claim 2 wherein said contacting is effected for a time sufficient to deposit upon said shrimp from about 0.001 to about 0.003 parts of canthaxanthin per part of shrimp.

10. The method of claim 2 wherein said elevated temperature is in the range of from about 50° C. to about 70° C.

11. The method of claim 10 wherein said shrimp are brought to said temperature prior to said contacting with said solution.

12. The method of claim 11 wherein said solution is brought to said temperature prior to said contacting with said shrimp.

* * * * *